(12) United States Patent
Schmid

(10) Patent No.: US 8,183,858 B2
(45) Date of Patent: May 22, 2012

(54) METHOD AND ARRANGEMENT FOR MEASURING A GAP

(75) Inventor: Robert Schmid, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 582 days.

(21) Appl. No.: 12/440,730

(22) PCT Filed: Sep. 12, 2006

(86) PCT No.: PCT/DE2006/001623
§ 371 (c)(1),
(2), (4) Date: Mar. 11, 2009

(87) PCT Pub. No.: WO2008/031368
PCT Pub. Date: Mar. 20, 2008

(65) Prior Publication Data
US 2009/0283008 A1 Nov. 19, 2009

(51) Int. Cl.
*G01B 7/14* (2006.01)
(52) U.S. Cl. .................. 324/207.26; 324/260

(58) Field of Classification Search .................. 324/260, 324/207.26
See application file for complete search history.

(56) References Cited

U.S. PATENT DOCUMENTS

| 3,849,724 A | | 11/1974 | Ghibu et al. | |
| 4,356,772 A | * | 11/1982 | van der Heide | 104/282 |
| 5,360,470 A | * | 11/1994 | Ono et al. | 104/284 |

FOREIGN PATENT DOCUMENTS

| DE | 3208896 A1 | 12/1982 |
| DE | 3323344 A1 | 1/1985 |
| FR | 2161617 A5 | 7/1973 |

* cited by examiner

*Primary Examiner* — Reena Aurora
(74) *Attorney, Agent, or Firm* — Laurence A. Greenberg; Werner H. Stemer; Ralph E. Locher

(57) ABSTRACT

A method for measuring the gap between a levitation magnet of a vehicle of a magnetic levitation railway and a fixed reaction rail of the magnetic levitation railway and for generating a gap measured value which specifies the size of the gap. In order to form the gap measured value, the magnetic field, which is generated by the levitation magnet, or at least a measured variable associated with the field is evaluated.

14 Claims, 9 Drawing Sheets

METHOD AND ARRANGEMENT FOR MEASURING A GAP

BACKGROUND OF THE INVENTION

Field of the Invention

The invention relates to a method for measuring the gap between a levitation magnet of a vehicle of a magnetic levitation railroad and a fixed-position reaction rail of the magnetic levitation railroad and for producing a gap measured value which indicates the size of the gap.

One such method is known, for example, from magnetic levitation railroads of the Transrapid type. The gap is measured for control purposes in order that the rail vehicle can always be kept hovering in a predetermined distance range above the track.

BRIEF SUMMARY OF THE INVENTION

The invention is based on the object of specifying a method for gap measurement, which can be carried out with particularly little effort.

The invention accordingly provides that the magnetic field, which is produced by the levitation magnet, or at least one measurement variable which is related to it is evaluated in order to form the gap measured value.

One major advantage of the method according to the invention is that this method does not require any active measurement components, that is to say for example no measurement components which produce their own magnetic field; this is because the gap measurement according to the invention evaluates the magnetic field distribution which is produced in any case by the levitation magnet; for example, there is therefore no need to produce any additional fields for the gap measurement.

The dual use according to the invention of the magnetic field which is produced by the levitation magnet allows the gap measurement to be physically integrated completely in the levitation magnet, for example, thus reducing production costs, in particular installation costs.

The gap measured value is preferably determined exclusively taking into account the magnetic field produced by the levitation magnet.

A first particularly advantageous variant of the method provides that the magnet current which flows through the levitation magnet is modulated by modulation of the magnet voltage which is applied to the levitation magnet, the change in the magnet current resulting from the modulation of the magnet voltage is detected and an inductance value is determined which indicates the inductance of the magnetic system comprising the levitation magnet, the reaction rail and the gap, and the gap measured value is formed using the inductance value and the magnet current value. The inductance value can be assessed because the gap is the governing influence on the magnetic flux and therefore on the resultant inductance. This first variant of the method has the advantage that the entire gap measurement can be integrated in the electrical drive or drive electrical system of the levitation magnet, as a result of which the hardware costs for gap measurement are very low.

The inductance value is preferably calculated taking into account the rate of change of the magnet current value and the change in the magnet voltage. By way of example, the inductance value is calculated using $$L = (\Delta U_m * \Delta t)/\Delta I_m$$

where $\Delta U_m$ denotes the change in the magnet voltage, $\Delta I_m$ the change in the magnet current and $\Delta t$ the time interval required for the change in the magnet current.

The gap measured value is preferably obtained using a previously determined family of characteristics in which gap values are entered for different inductances and magnet current values, or for corresponding measured value pairs.

The family of characteristics is preferably created on the basis of measurements carried out in advance on the levitation magnet and the reaction rail for different gap sizes or on the basis of measurements on physically identical levitation magnets and physically identical reaction rails, or on the basis of a simulation of the magnetic system comprising the levitation magnets in a reaction rail and gap.

When the magnet currents are high, one problem that can occur in some circumstances is that the gap measurement is corrupted as a result of saturation phenomena in the magnet iron of the levitation magnet and/or of the reaction rail, for example, the unambiguity in the association between the inductance and the gap may be lost. For this reason, it is considered to be advantageous if for magnet current values below a predetermined limit, the gap value read from the family of characteristics in the described way is still used as the gap measured value, and if, for magnet current values above the limit, a further measurement is taken.

A total magnetic flux caused by the levitation magnet or a component thereof is preferably measured using a passive magnetic field sensor in the course of the further measurement, with a magnetic flux measured value being formed, and a second gap value is deduced from the magnetic flux measured value and the magnet current value. The expression a passive magnetic field sensor means a sensor which does not produce its own magnetic field and just measures an existing magnetic field.

By way of example, the magnetic stray flux or the magnetic useful flux causing the levitation can be measured as a component of the total flux.

The second gap value is preferably obtained by using a previously determined second family of characteristics in which gap values are entered for different magnetic flux measured values and magnet current values, or corresponding measured value pairs. The second family of characteristics is preferably created on the basis of measurements carried out in advance on the levitation magnet and the reaction rail for different gap sizes, or on the basis of measurements of physically identical levitation magnets and physically identical reaction rails, or on the basis of a simulation of the magnetic system comprising the levitation magnets, reaction rail and gap.

In the case in which the first family of characteristics produces two possible different gap values, the gap value in the first family of characteristics that is used as the gap measured value is preferably that which is closer to the second gap value.

Alternatively, in the case when the first family of characteristics produces two possible different gap values, that gap value in the first family of characteristics which is closer to the second gap value is averaged with the second gap value, with the final gap measured value being formed.

A second, particularly advantageous, variant of the method provides that a magnetic flux which is caused by the magnet current is measured using a passive magnetic field sensor with a magnetic flux measured value being formed, and the gap measured value is formed on the basis of the magnetic flux measured value and the magnet current value.

By way of example, the total magnetic flux, the magnetic stray flux or the magnetic useful flux causing the levitation can be measured as the magnetic flux.

The gap measured value is preferably obtained by using a previously determined family of characteristics in which gap values are entered for different magnetic flux measurement values and magnet current values, or for corresponding measured value pairs.

A family of characteristics such as this is preferably created on the basis of measurements carried out in advance on the levitation magnet and the reaction rail for different gap sizes, or on the basis of measurements of physically identical levitation magnets and physically identical reaction rails, or on the basis of a simulation of the magnetic system comprising the levitation magnets, reaction rail and gap.

A third particularly advantageous variant of the method provides that a first magnetic flux, which is caused by the levitation magnet, is measured using a first passive magnetic field sensor, with a first magnetic flux value being formed, and a second magnetic flux, which is caused by the levitation magnet and differs from the first magnetic flux, is measured using a second passive magnetic field sensor, with a second magnetic flux value being formed, and the gap measured value is obtained by using a previously determined family of characteristics in which gap values are entered for different first magnetic and second magnetic fluxes, or for corresponding measured value pairs.

By way of example, the first magnetic flux is formed by the total flux which is produced by the levitation magnet, and the second magnetic flux is formed by the useful flux or the stray flux which is produced by the levitation magnet.

Alternatively, the first magnetic flux can be formed by the useful flux which is produced by the levitation magnet, and the second magnetic flux can be formed by the stray flux which is produced by the levitation magnet.

The family of characteristics is preferably created on the basis of measurements carried out in advance on the levitation magnet and the reaction rail for different gap sizes, or on the basis of measurements of physically identical levitation magnets and physically identical reaction rails, or on the basis of a simulation of the magnetic system comprising the levitation magnets, reaction rail and gap.

The invention also relates to an arrangement for measuring the gap between a levitation magnet of a vehicle of a magnetic levitation railroad and a fixed-position reaction rail of the magnetic levitation railroad and for producing a gap measured value which indicates the size of the gap.

This aspect of the invention is based on the object of specifying an arrangement for gap measurement, which arrangement can be produced with particularly little effort.

According to the invention, this object is achieved in that the arrangement has an evaluation device which takes into account the magnetic field produced by the levitation magnet or at least one measurement variable associated with it in order to determine the gap measured value.

With regard to the advantages of the arrangement according to the invention, reference should be made to the above statements relating to the method according to the invention, since the advantages of the method and those of the arrangement essentially correspond.

The gap measured value is preferably determined exclusively taking into account the magnetic field produced by the levitation magnet.

According to a first particularly preferred refinement of the arrangement, the evaluation device has:
a signal source for producing an electrical modulation voltage for modulating the magnet voltage which is applied to the levitation magnet,
a measurement device, which is connected to the levitation magnet, for measuring the magnet current caused by the modulated magnet voltage,
a measured value formation device which is connected to the measurement device and determines an inductance value, which indicates the inductance of the magnetic system comprising the levitation magnet, reaction rail and gap, taking into account the rate of change of the magnet current on the basis of the modulation of the magnet voltage, and forms the gap measured value using the inductance value and the magnet current value.

The measured value formation device may, for example, be formed by a computation device and may, for example, be contained in a control device.

The measured value formation device preferably comprises a memory device or is connected to a memory device such as this, in which a previously determined family of characteristics is stored, in which gap values are entered for different inductances and magnet current values.

According to a second particularly preferred refinement of the arrangement, the evaluation device has:
a measurement device for measuring the magnet current flowing through the levitation magnet,
a passive magnetic field sensor for measuring the magnetic flux caused by the magnet current, with a magnetic flux measured value being formed, and
a measured value formation device which forms the gap measured value using the magnetic flux measured value of the magnetic field sensor and the magnet current value.

According to the second refinement, the measured value formation device preferably comprises a memory device or is connected to a memory device such as this, in which a previously determined family of characteristics is stored, in which gap values are entered for different magnetic flux measured values and magnet current values.

According to a third particularly preferred refinement of the arrangement, the evaluation device has:
a first passive magnetic field sensor for measuring a first magnetic flux caused by the levitation magnet and for forming a first magnetic flux measured value,
a second passive magnetic field sensor for measuring a second magnetic flux, which is caused by the levitation magnet and differs from the first magnetic flux, and for forming a second magnetic flux measured value, and
a measured value formation device which forms the gap measured value using the first and the second magnetic flux measured value.

According to the third refinement, the measured value formation device preferably comprises a memory device or is connected to a memory device such as this, in which a previously determined family of characteristics is stored, in which gap values are entered for different first and second magnetic flux measured values.

The levitation magnet whose magnetic field is used for gap determination may be formed by one or more individual poles of a supporting magnet or by the totality of all the individual poles of the supporting magnet.

Irrespective of the specific configuration of the evaluation device, that is to say whether this is the first, the second, the third or some other variant, it is considered to be advantageous with regard to having a minimum number of components for the evaluation device to form an integral component of the levitation magnet.

As can be seen from the above statements, a plurality of measurement variables are considered preferable for formation of the gap measured value. Very precise measurement results can be formed in a simple manner, and therefore advantageously, by forming individual gap measured values using each of two or more measurement variants, with the result that individual gap measured values being averaged, with a final gap measured value being formed. The averaging process can take account of the individual gap measured values with equal weightings; alternatively, it is also possible to first of all determine the respective measurement accuracy, preferably quantitatively, for each measurement variant that is used, and for the averaging of the individual gap measured values then to be carried out taking account of the respective measurement accuracy. Variants with high measurement accuracy preferably have a higher weighting than variants with a low measurement accuracy.

The invention will be explained in more detail in the following text with reference to exemplary embodiments; in this case, by way of example:

DESCRIPTION OF THE INVENTION

For the sake of clarity, the same reference symbols are used for identical or comparable components in FIGS. 1 to 10.

Figure 1:
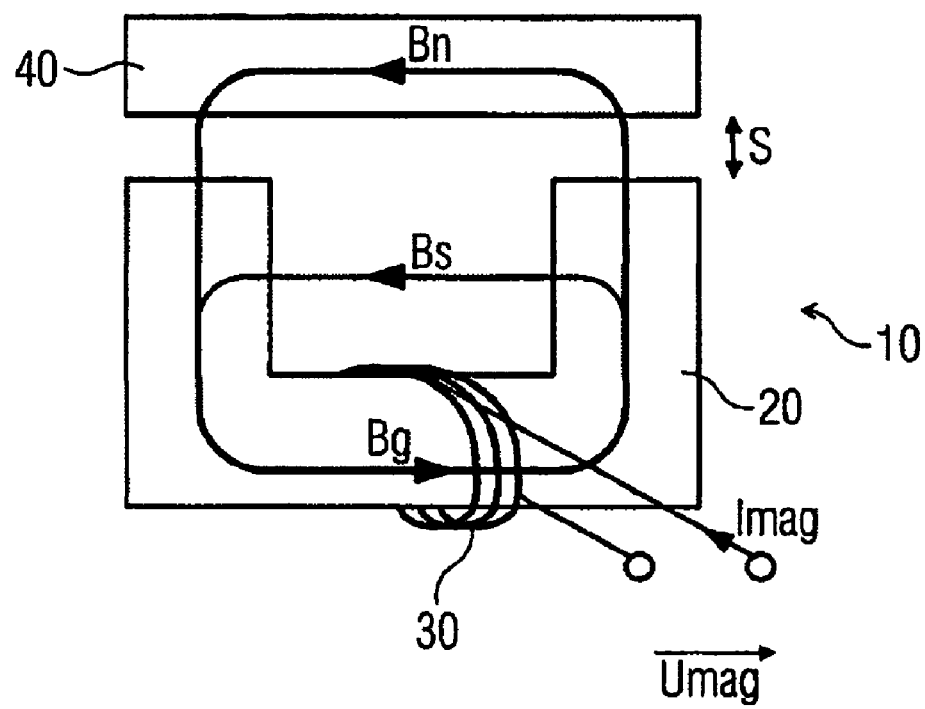
FIG. 1 shows a schematic outline illustration of a magnetic supporting system for a magnetic levitation railroad.

By way of example, FIG. 1 shows a magnetic supporting system 10 with a levitation magnet 20. The levitation magnet 20 is equipped with a field winding 30 which is wound around the levitation magnet 20. The levitation magnet 20 belongs to a rail vehicle, which is not illustrated in any more detail in FIG. 1, of a magnetic levitation railroad.

A fixed-position reaction rail 40 is separated from the levitation magnet 20 by a gap S and belongs to a trackside device of the magnetic levitation railroad, which device is not illustrated in any more detail.

When an electric current, referred to in the following text as the magnet current Imag, flows through the field winding 30, then a magnetic flux is produced. The total flux Bg produced by the field winding 30 leads to a useful flux Bn, which passes through the gap S and flows through the reaction rail 40, as well as a stray flux Bs, which has no function for the supporting system and, so to speak, is lost; thus:

$$Bg=Bs+Bn.$$

Various measurement variants can be used in order to measure the gap S or the distance S between the reaction rail 40 and the levitation magnet 20, and these take account of the magnetic field produced by the levitation magnet, in order to determine the gap measured value.

Figure 2:
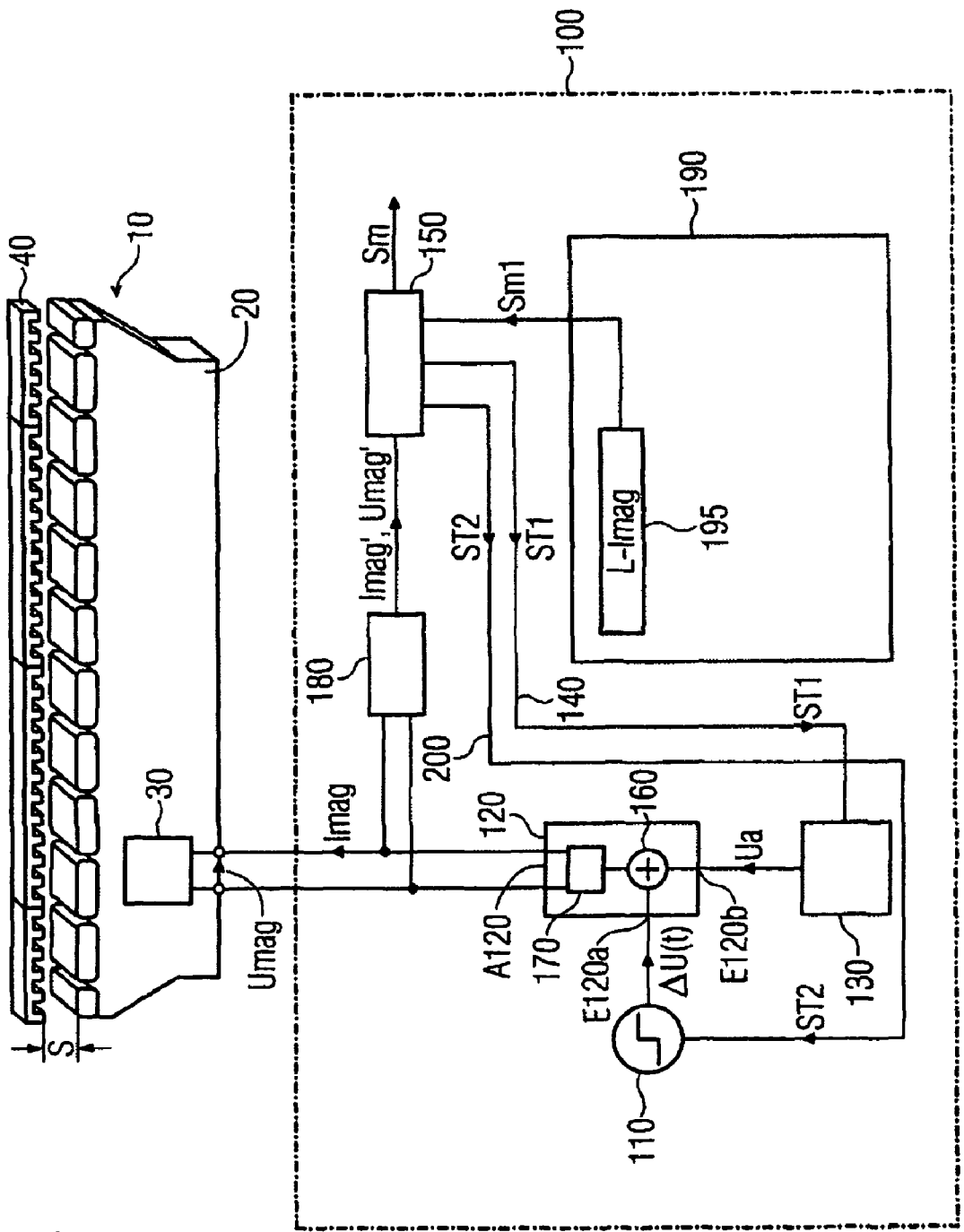
FIG. 2 shows a first exemplary embodiment of an arrangement for measuring the gap, in which the inductance of the supporting system is determined and taken into account.

FIG. 2 shows a first exemplary embodiment of an arrangement for measuring the gap S, in which the inductance L of the supporting system 10 is determined and taken into account. As can be seen, the levitation magnet 20 can be formed by the totality of a multiplicity of individual poles of a supporting magnet. Alternatively, it is also possible to carry out the measurement method described in the following text using one individual pole: in this case, the levitation magnet which is used for measurement would thus be formed by one such individual pole.

FIG. 2 shows an evaluation device 100 which is connected to the levitation magnet 20. The evaluation device 100 is equipped with the signal source 110 which is arranged on the output side downstream from an input E120a of an input device 120. A further input E120b of the input device 120 is preceded by a drive voltage source 130, which causes a voltage Ua for producing a predetermined gap S between the reaction rail 40 and the levitation magnet 20. In order to control the drive voltage source 130, this source 130 is connected via a control line 140 to a control device 150 which is equipped with a computation device, which is not illustrated in any more detail.

The input device 120 has an adding element 160 whose input side is connected to the two inputs E120a and E120b of the input device 120 and whose output side is connected to an amplifier 170. The output of the amplifier 170 may, for example, form the output A120 of the input device 120.

The field winding 30 of the levitation magnet 20 is connected to the output A120 of the input device 120; the field winding 30 is illustrated only schematically, as a block, for the sake of clarity.

A measurement device 180 is connected to the field winding 30 and measures the magnet voltage Umag, which is emitted from the input device 120 and is applied to the levitation magnet 20, and the magnet current Imag, which flows through the levitation magnet 20, and this measurement device 180 produces corresponding magnet current values Imag' and magnet voltage values Umag'.

The measurement device 180 is followed on the output side by the control device 150 which evaluates the measured values Imag' and Umag' and which, on the output side, produces a gap measured value Sm which indicates the size of the gap S.

The control device 150 is connected to a memory device 190 in which a family of characteristics in the form of an L-Imag family of characteristics 195 is stored in order to form the gap measured value Sm.

The arrangement shown in FIG. 2 is operated, for example, as follows:

The control device 150 controls the driver voltage source 130 such that it produces an output voltage Ua. The output voltage Ua results in a magnetic useful flux Bn (cf. FIG. 1) being produced in the levitation magnet 20, which useful flux Bn leads to a gap S between the reaction rail 40 and the levitation magnet 20. The driver is provided by means of a control signal ST1 via the control line 140.

Via a further control line 200, the control device 150 produces a further control signal ST2 which is passed to the signal source 110 which then produces a square-wave signal $\Delta U(t)$ with a predetermined period duration T and an amplitude $\Delta Um$. The amplitude $\Delta Um$ of the square-wave signal $\Delta U(t)$ preferably has a magnitude which is less than that of the output voltage Ua of the drive voltage source 130; this is because the square-wave signal $\Delta U(t)$ is used only for measurement and not to "support" or produce the gap S. A magnet voltage Umag(t) for the levitation magnet 20 is therefore formed at the output A120 of the input device 120 as follows:

$$Umag(t)=Ua+\Delta U(t)$$

Figure 3:
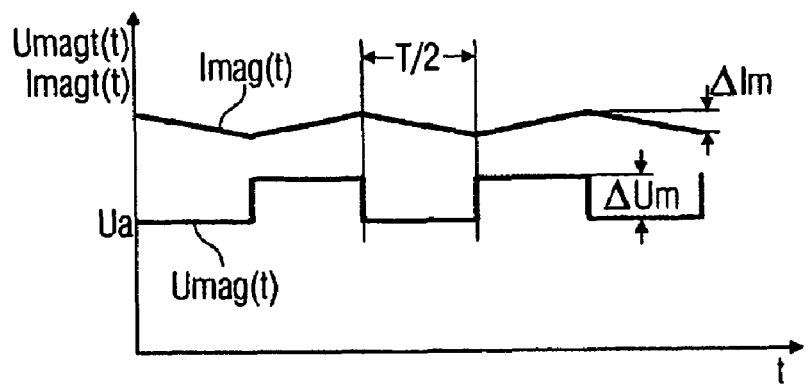
FIG. 3 shows examples of current and voltage profiles on the basis of which the inductance of the supporting system is determined.

FIG. 3 illustrates the corresponding time profile of the magnet voltage Umag.

The inductance L of the magnetic supporting system 10 comprising the levitation magnet 20, the gap S and the reaction rail 40 results in a magnet current profile Imag(t) as follows:

$$Umag(t)=L*dImag(t)/dt$$

FIG. 3 likewise illustrates the current profile.

The inductance L of the supporting system 10 can now be calculated relatively easily by evaluating the current profile Imag as follows:

$$L=(\Delta Um*\Delta t)/\Delta Im$$

$$L=(\Delta Um*T/2)/\Delta Im$$

where $\Delta Um$ denotes the change in the magnet voltage, $\Delta Im$ the change in the magnet current and $\Delta t$ the time period required for the change in the magnet current.

The inductance L is a variable which is characteristic of the gap S because the total magnetic flux Bg depends on the gap S; the gap S can accordingly be determined by evaluation of the inductance L.

Figure 4:
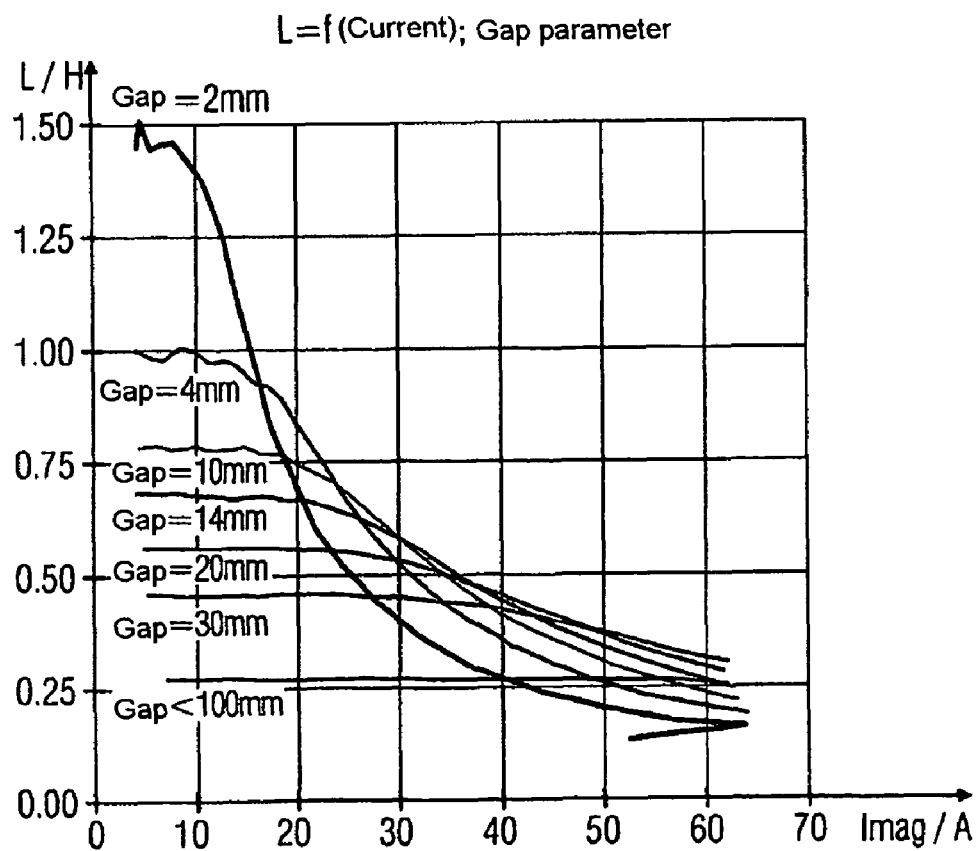
FIG. 4 shows an example of a family of characteristics from which gap values can be read as a function of the inductance of the supporting system and of the magnet current of the levitation magnet.

By way of example, FIG. 4 illustrates the L-Imag family of characteristics 195, which is suitable for determining the gap S as a function of the inductance L and the magnet current Imag. The figure shows a multiplicity of characteristics for different gap values.

As can be seen, in the example shown in FIG. 4, an unambiguous association of a gap value S is possible for magnet currents Imag below about 17 A, as a function of the respective magnet current Imag and the respective inductance L, and the gap S can accordingly be determined on the basis of the measured values for the magnet current Imag and the inductance L. If, for example, a magnet current Imag=10 A and an inductance of L=0.8H are measured, then the gap S is about 10 mm. If an inductance of L=0.4 H is measured for this current Imag=10 A, the gap is about 30 mm.

The control device 150 is therefore able to read a gap value Sm1 as a function of the inductance L and the magnet current Imag from the L-Imag family of characteristics 195, and to emit this on the output side as a gap measured value Sm.

The L-Imag family of characteristics 195 shown in FIG. 4 is based on the assumption, for example, that saturation phenomena occur in the magnet iron of the levitation magnet 20 and/or in the magnet iron of the reaction rail 40 for magnet currents above about 17 A, and that, accordingly, the function L=f(Imag, S) is no longer unambiguous. For example, the gap in the case of a magnet current of 17 A and an inductance L of about 0.9H may be both 2 mm and 4 mm, because the curves for a gap of 2 mm and for a gap of 4 mm intersect at this point or for this measured value pair (17 A; 0.9H).

Figure 5:
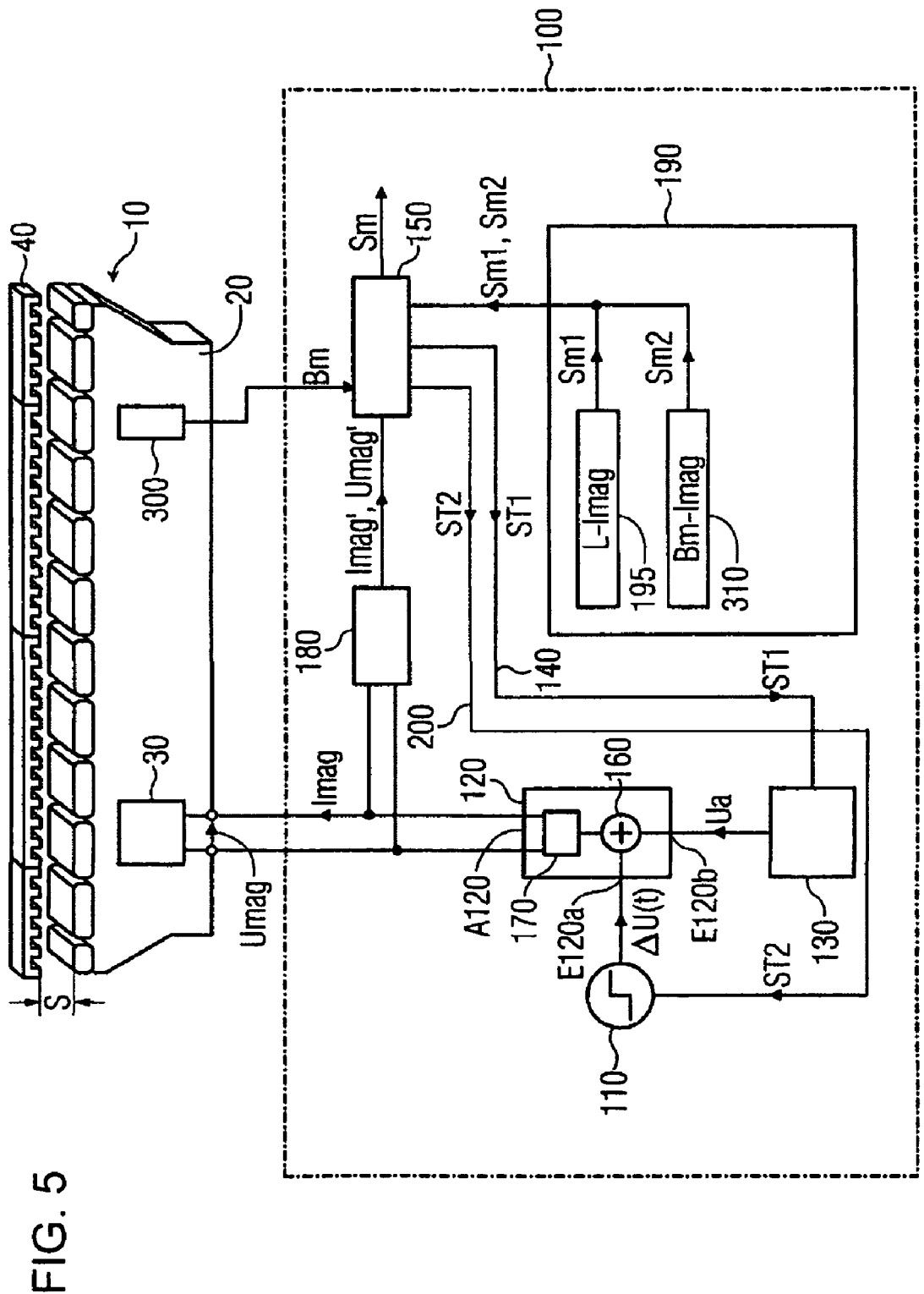
FIG. 5 shows a second exemplary embodiment of an arrangement for measuring the gap, in which the inductance of the supporting system and a magnetic flux of the levitation magnet and the magnet current of the levitation magnet are taken into account.

In order to allow an unambiguous and reliable gap measurement for high magnet currents Imag of more than 17 A as well, a further measurement is also carried out according to a second exemplary embodiment, in addition to the explained gap measurement on the basis of the inductance L, and produces a second gap value Sm2. By way of example, FIG. 5 shows a corresponding arrangement. As can be seen, the control device 150 is connected to an active or preferably passive magnetic field sensor 300 (for example a Hall probe or a magnetoresistive sensor), which measures a magnetic flux—specifically the useful flux Bn, the total flux Bg or the stray flux Bs of the levitation magnet 20—with a magnetic flux measured value Bm being formed.

In this case, a second family of characteristics is stored in the memory device 190, in the form of a Bm-Imag family of characteristics 310 in which gap values are entered as a function of the gap for different magnetic flux measured values Bm and the associated magnet current values Imag.

The control device 150 therefore evaluates the magnetic flux measured values Bm of the magnetic field sensor 300 and the magnet current Imag using the Bm-Imag family of characteristics 310, and reads a second gap value Sm2 from the Bm-Imag family of characteristics 310.

This second gap value Sm2 is compared with the possible gap values Sm1 of the L-Imag family of characteristics 195, and the gap value Sm1 from the L-Imag family of characteristics 195 which is emitted as the gap measured value Sm is that which best matches the second gap value Sm2. Alternatively, the second gap value Sm2 and the first gap value Sm1 which best matches it can also be averaged, as follows:

$$Sm=(Sm1+Sm2)/2$$

Figure 6:
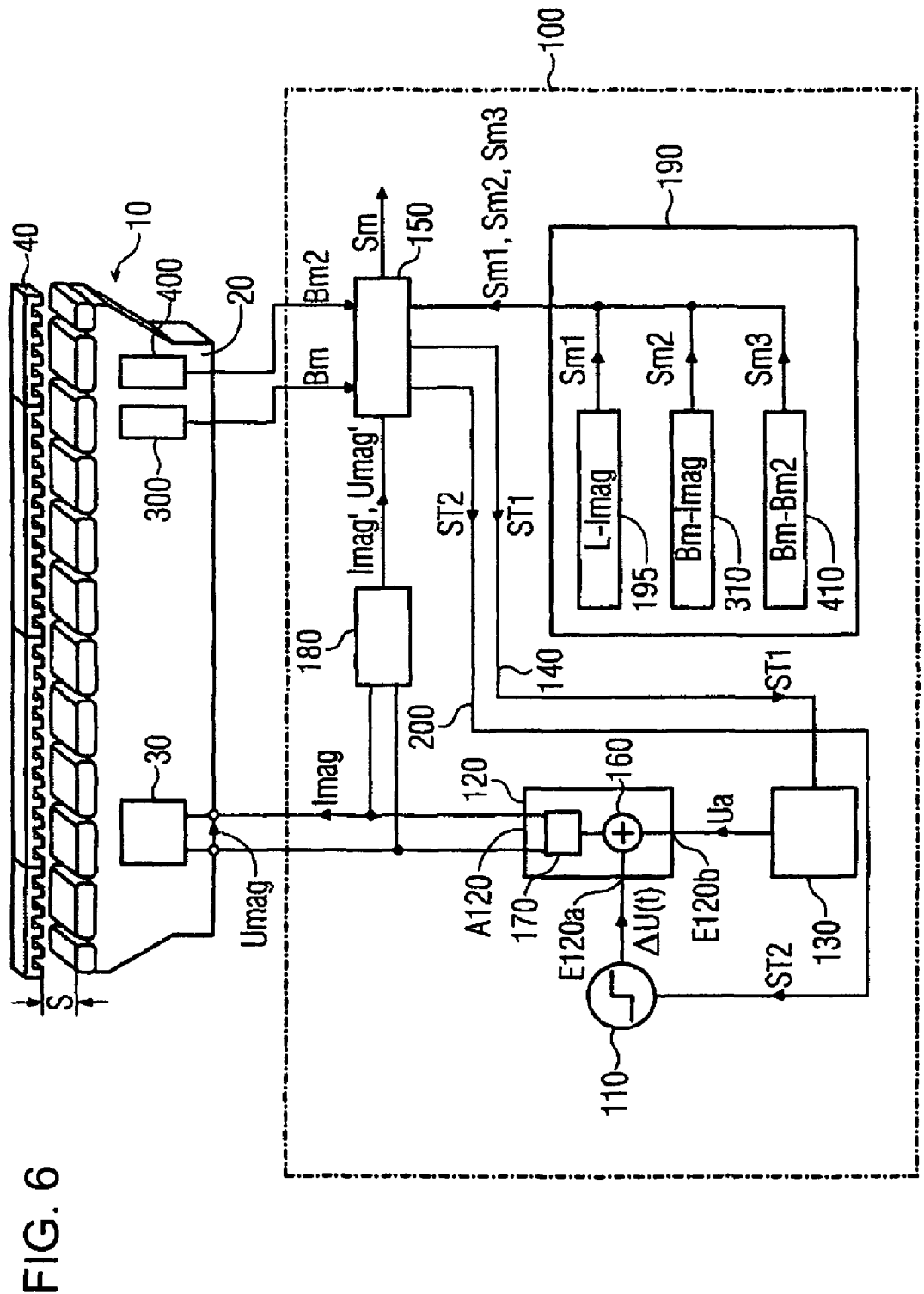
FIG. 6 shows a third exemplary embodiment of an arrangement for measuring the gap, in which two magnetic fluxes of the levitation magnet, the magnet current of the levitation magnet and the inductance of the supporting system are taken into account.

In order to increase the measurement accuracy even further, a further active or passive magnetic field sensor can also be provided, as will be explained in conjunction with FIG. 6.

In this third exemplary embodiment, the control device 150 is connected not only to the first active or—preferably—passive magnetic field sensor 300 (for example a Hall element) but also to a second active or—preferably—passive magnetic field sensor 400 (for example a Hall element) which measures a second magnetic flux, to be precise a different magnetic flux to the first magnetic field sensor 300. Depending on the type of magnetic flux which the first magnetic field sensor 300 measures, the second magnetic field sensor 400 will measure the useful flux Bn, the total flux Bg or the stray flux Bs, with a second magnetic flux measured value Bm2 being formed.

In this case, a third family of characteristics in the form of a Bm-Bm2 family of characteristics 410 is additionally stored in the memory device 190, in which gap values Sm3 are entered for different magnetic flux measured value pairs Bm and Bm2, as a function of the gap.

The control device 150 therefore also evaluates the second magnetic flux measured value Bm2 of the second magnetic field sensor 400 using the Bm-Bm2 family of characteristics, and reads a third gap value Sm3 therefrom.

This third gap value Sm3 can be averaged with the other gap values Sm1 and Sm2. The second gap value Sm2 and/or the third gap value Sm3 are/is preferably compared for this purpose with the possible gap values Sm1 in the L-Imag family of characteristics 195, and that gap value Sm1 in the L-Imag family of characteristics which best matches the two gap values Sm2 and Sm3 is averaged with these two gap values Sm2 and Sm3, as follows:

$$Sm=(Sm1+Sm2+Sm3)/3$$

Figure 7:
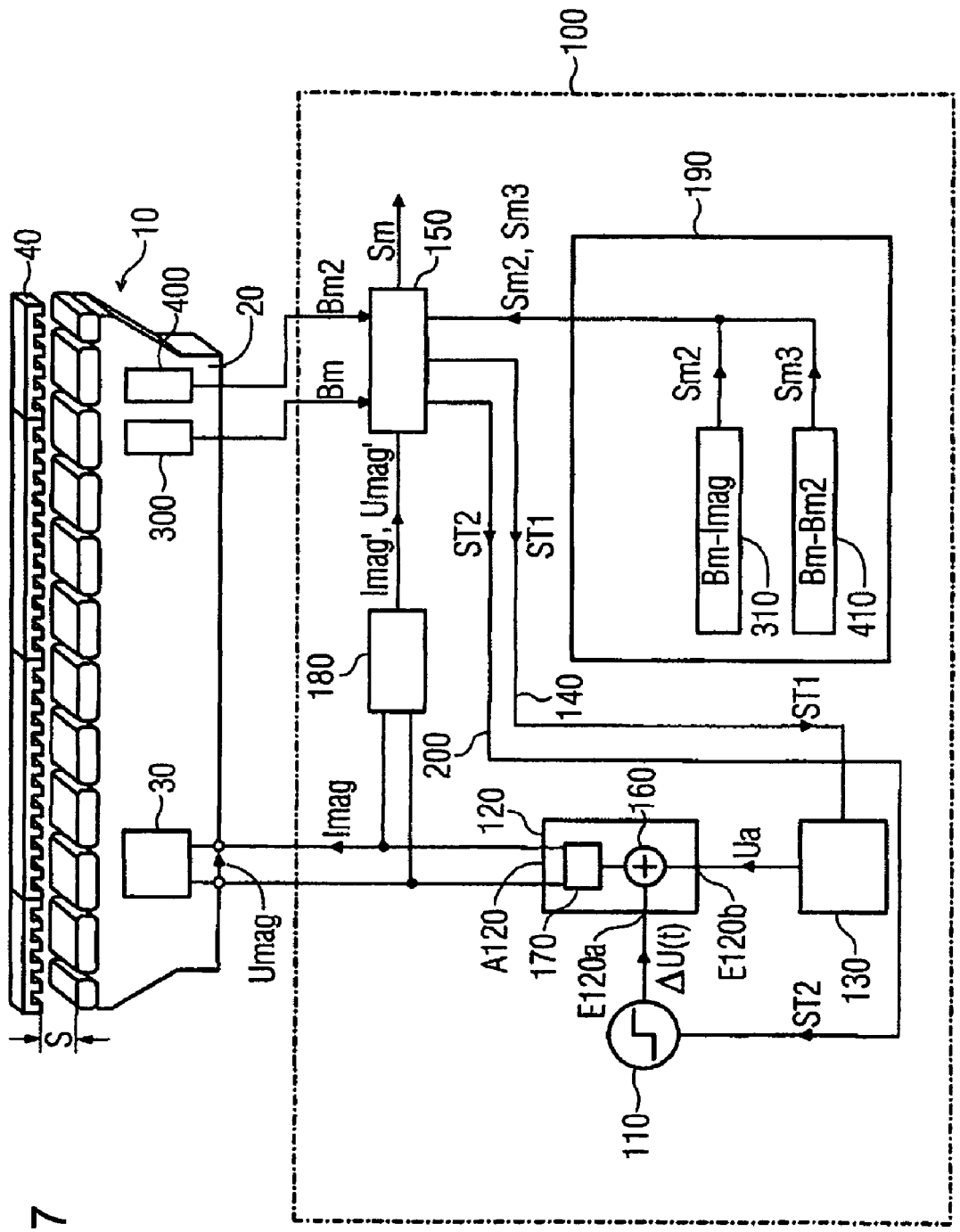
FIG. 7 shows a fourth exemplary embodiment of an arrangement for measuring the gap, in which two magnetic fluxes of the levitation magnet as well as the magnet current of the levitation magnet are taken into account.

FIG. 7 shows a fourth exemplary embodiment of an evaluation device 100. In this exemplary embodiment, the control device 150 determines the gap measured value Sm exclusively on the basis of a Bm-Imag family of characteristics 310 and a Bm-Bm2 family of characteristics 410, in that it reads a gap value Sm2 from the Bm-Imag family of characteristics 310 as a function of the magnet current Imag and the magnetic flux value Bm, and reads a gap value Sm3 from the Bm-Bm2 family of characteristics 410 as a function of the magnetic flux values Bm and Bm2. It then averages the two gap values Sm2 and Sm3, with the gap measured value Sm being formed as follows:

$$Sm=(Sm2+Sm3)/2$$

The two magnetic field sensors 300 and 400 are preferably passive sensors (for example Hall elements).

Figure 8:
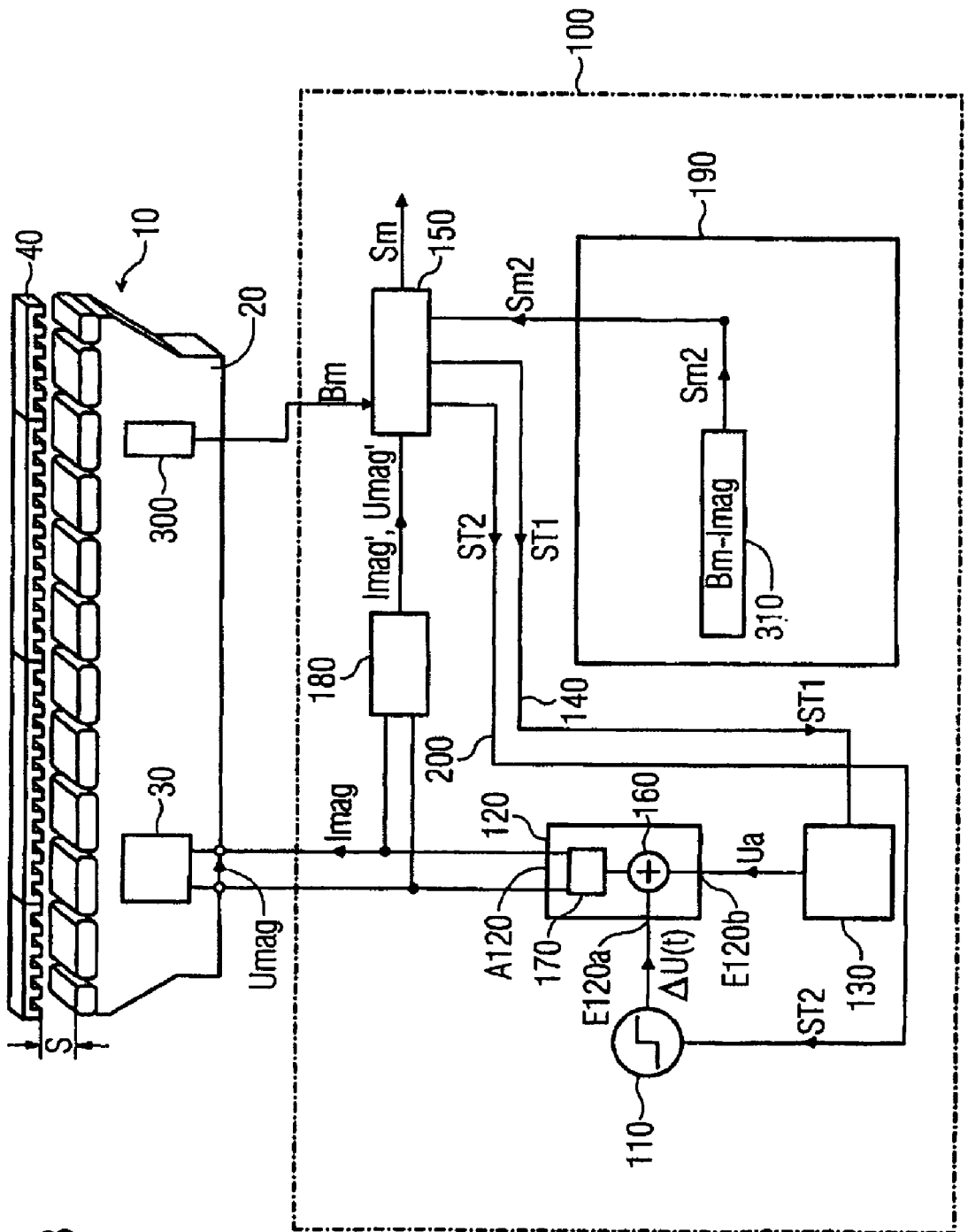
FIG. 8 shows a fifth exemplary embodiment of an arrangement for measuring the gap, in which a magnetic flux of the levitation magnet and the magnet current of the levitation magnet are taken into account.

FIG. 8 shows a fifth exemplary embodiment of an evaluation device 100. In this exemplary embodiment, the control device 150 determines the gap measured value Sm solely on the basis of a Bm-Imag family of characteristics 310 in that it reads a gap value Sm2 from the Bm-Imag family of characteristics 310 as a function of the magnet current Imag and the magnetic flux value Bm, and outputs this as the gap measured value Sm. The magnetic field sensor 300 is preferably a passive sensor (for example a Hall element).

Figure 9:
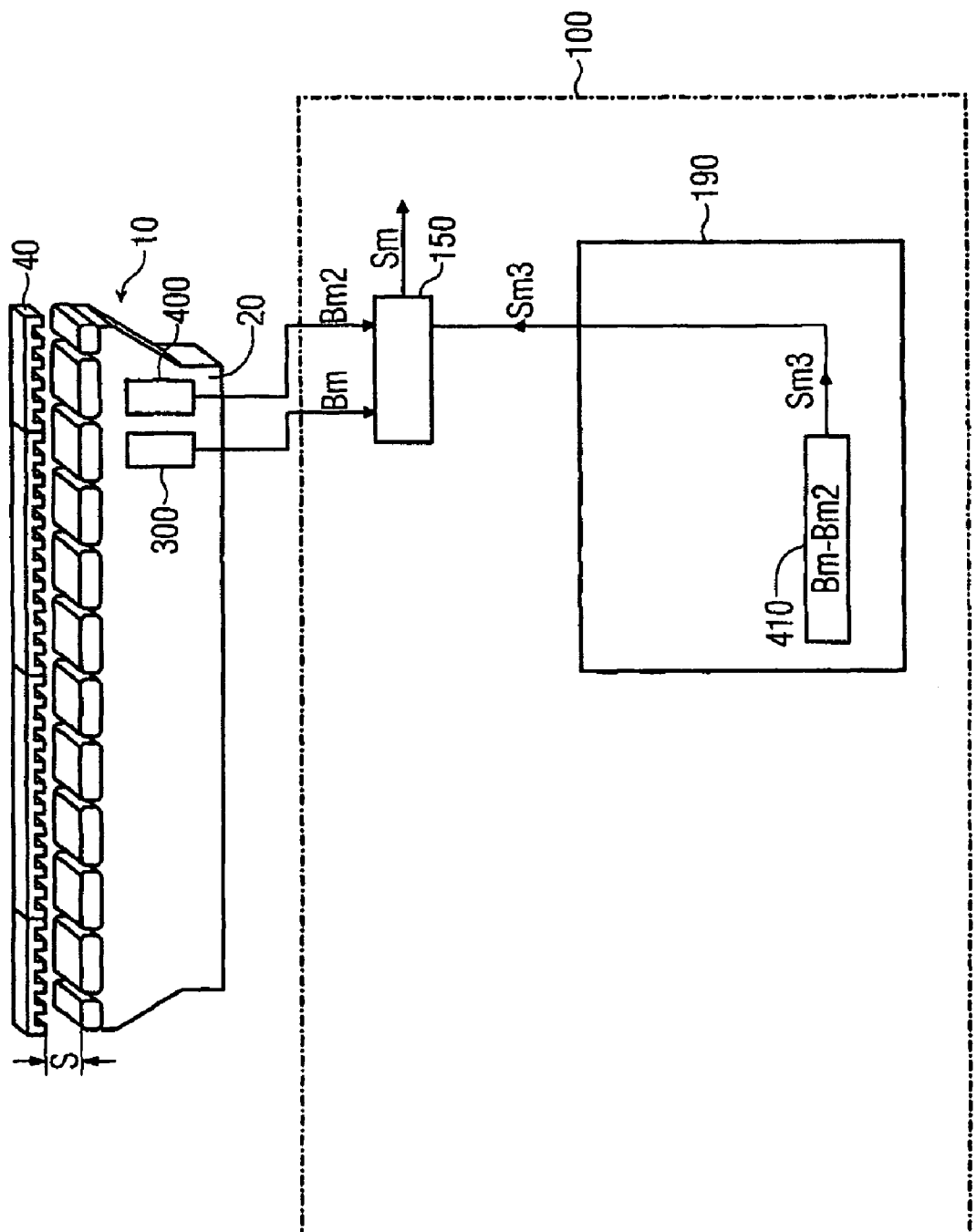
FIG. 9 shows a sixth exemplary embodiment of an arrangement for measuring the gap, in which two magnetic fluxes of the levitation magnet are taken into account.

FIG. 9 shows a sixth exemplary embodiment of an evaluation device 100. In this exemplary embodiment, the control device 150 determines the gap measured value Sm solely on the basis of a Bm-Bm2 family of characteristics 410, in that it reads a gap value S3 from the Bm-Bm2 family of characteristics 410 as a function of the magnetic flux values Bm and Bm2 of two preferably passive magnetic field sensors 300 and 400 (for example Hall elements), and outputs this as the gap measured value Sm.

Figure 10:
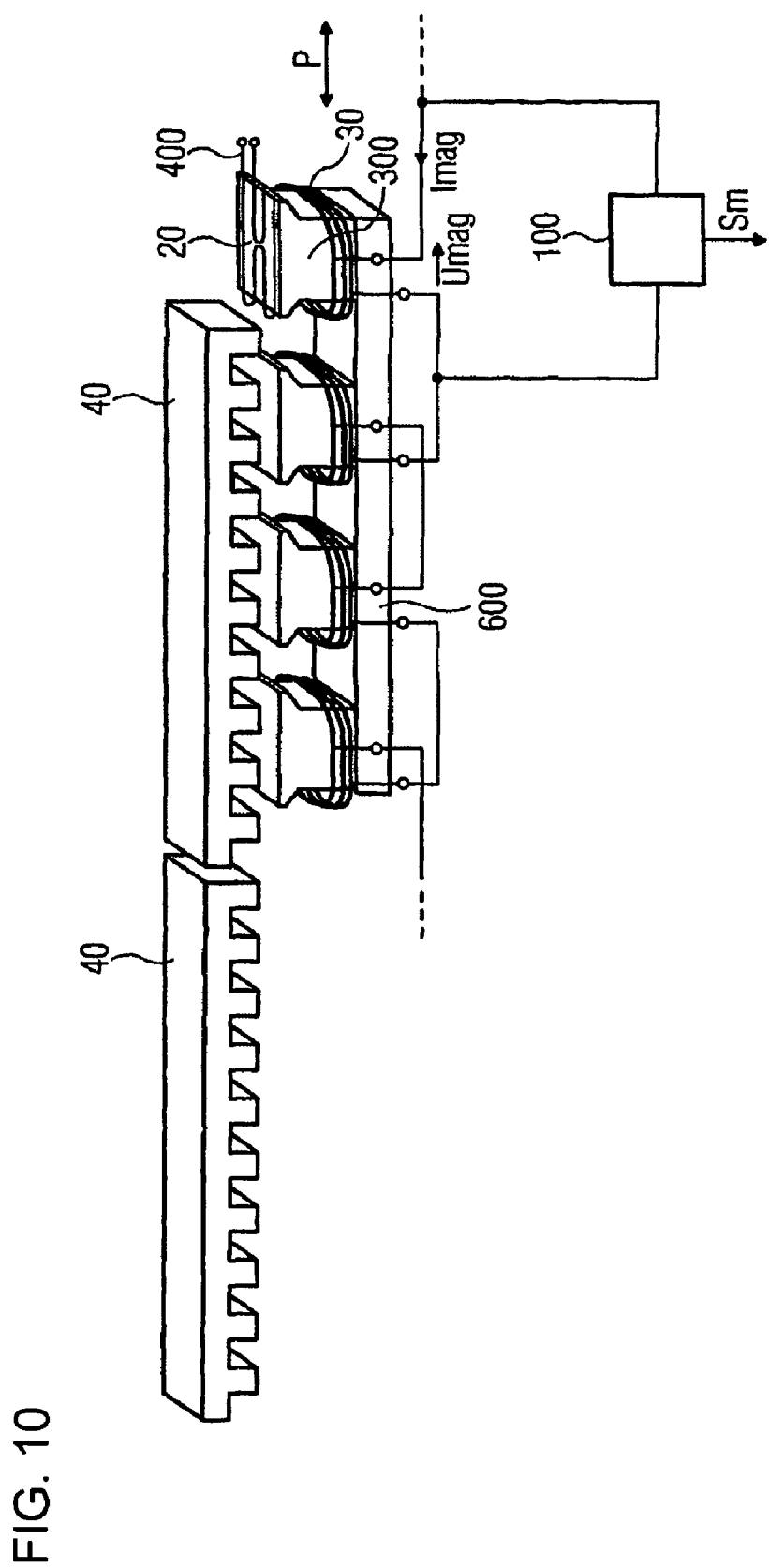
FIG. 10 shows a seventh exemplary embodiment of an arrangement for measuring the gap, in which the measurement is carried out on an individual pole of a supporting magnet.

FIG. 10 shows a seventh exemplary embodiment of an arrangement for measuring the gap S. In this example, the levitation magnet 20 is formed by an individual pole of a supporting magnet 600. The evaluation device 100 measures the magnet current Imag and the magnet voltage Umag at the individual pole, and determines the gap measured value Sm using a magnetic flux measured value from a passive magnetic sensor 300 and/or from an active magnetic sensor 400 which is formed by a measurement coil. An arrow P indicates the direction of travel of the magnetic levitation railroad.

In the example shown in FIG. 10, the respective gap can be determined for each individual pole of the supporting magnet 600, and therefore in a redundant form. Since the width of the pole shoes of the supporting magnet 600—seen in the direction of travel—is greater than that of the pole gaps, the ripple caused by the cogging of the reaction rail 40 in the measurement signal can easily be suppressed by the described measurement method, which is based on the magnet current Imag and the magnet voltage Umag, since—in comparison to a measurement in the region of the pole gap—a relatively long undisturbed integration length is possible.

List of reference symbols
10 Magnetic supporting system
20 Levitation magnet
30 Field winding
40 Reaction rail
100 Evaluation device
110 Signal source
120 Input device
130 Drive voltage source
140 Control line
150 Control device
160 Adding element
170 Amplifier
180 Measurement device
190 Memory device
195 L-Imag family of characteristics
200 Further control line
300 Magnetic field sensor
310 Bm-Imag family of characteristics
400 Magnetic field sensor
410 Bm-Bm2 family of characteristics
600 Supporting magnet
Sm1 Gap value
Sm2 Gap value
Sm3 Gap value
Sm Gap measured value
Imag Magnet current
Imag' Magnet current measured value
Umag Magnet voltage
Umag' Magnet voltage measured value
Ua Output voltage
Bg Total flux
Bn Useful flux
Bs Stray flux
S Gap
L Inductance
ST1 Control signal
ST2 Further control signal
T Period duration
ΔUm Amplitude
ΔU(t) Square-wave signal
P Direction of travel

The invention claimed is:

1. A method for measuring a gap between a levitation magnet of a vehicle of a magnetic levitation railway and a fixed-position reaction rail of the magnetic levitation railway, the method which comprises:
   determining a magnetic field produced by the levitation magnet or a measurement variable related to the magnetic field; and
   evaluating the magnetic field or at least one measurement variable related to the magnetic field, and producing therefrom a gap measured value indicating the size of the gap;
   modulating a magnet current flowing through the levitation magnet by modulation of a magnet voltage applied to the levitation magnet;
   detecting a change in the magnet current resulting from the modulation of the magnet voltage and determining an inductance value based on the change in the magnet current, wherein the inductance value indicates an inductance of the magnetic system having the levitation magnet, the reaction rail, and the gap; and
   forming the gap measured value using the inductance value and the magnet current.

2. The method according to claim 1, which comprises calculating the inductance value taking into account a rate of change of the magnet current value and a change in the magnet voltage.

3. The method according to claim 1, which comprises obtaining the gap measured value by using a previously determined family of characteristics in which gap values are entered for different inductances and magnet current values.

4. The method according to claim 3, which comprises, for magnet current values below a predetermined limit, still using the gap value read from the family of characteristics as the gap measured value, and for magnet current values above the limit, taking a further measurement.

5. The method according to claim 4, which comprises:
measuring a total magnetic flux caused by the levitation magnet or a component thereof using a passive magnetic field sensor in the course of the further measurement, and thereby forming a magnetic flux measured value; and
deducing a second gap value from the magnetic flux measured value and the magnet current value.

6. The method according to claim 5, wherein the second gap value is obtained by using a previously determined second family of characteristics in which gap values are entered for different magnetic flux measured values and magnet current values.

7. The method according to claim 5, wherein, in cases in which the first family of characteristics produces two possible different gap values, that gap value of the first family of characteristics which is closer to the second gap value is averaged with the second gap value, the gap measured value being formed.

8. The method according to claim 1, which comprises measuring a magnetic flux caused by a magnet current flowing through the levitation magnet with a passive magnetic field sensor and forming a magnetic flux measured value, and forming the gap measured value on the basis of the magnetic flux measured value and the magnet current value.

9. The method according to claim 8, which comprises obtaining the gap measured value by using a previously determined family of characteristics in which gap values are entered for different magnetic flux measurement values and magnet current values.

10. The method according to claim 1, which comprises:
measuring a first magnetic flux, which is caused by the levitation magnet, using a first passive magnetic field sensor, thereby forming a first magnetic flux value;
measuring a second magnetic flux, which is caused by the levitation magnet and differs from the first magnetic flux, using a second passive magnetic field sensor, thereby forming a second magnetic flux value; and
obtaining the gap measured value from a previously determined family of characteristics in which gap values are entered for different measured value pairs for the first magnetic flux and the second magnetic flux.

11. An arrangement for measuring a gap between a levitation magnet of a vehicle of a magnetic levitation railway and a fixed-position reaction rail of the magnetic levitation railway, comprising:
an evaluation device configured to evaluate a magnetic field produced by the levitation magnet or at least one measurement variable associated therewith and to output a gap measured value indicating a size of the gap;
a signal source producing an electrical modulation voltage which modulates a magnet voltage applied to the levitation magnet;
a measurement device connected to the levitation magnet, said measurement device measuring a magnet current caused by the modulated magnet voltage; and
a measured value formation device connected to the measurement device and configured to determine an inductance value, which indicates the inductance of the magnetic system including the levitation magnet, the reaction rail, and the gap, taking into account a rate of change of the magnet current on the basis of the modulation of the magnet voltage, and to form the gap measured value using the inductance value and the magnet current value.

12. The arrangement according to claim 11, wherein said evaluation device includes:
a measurement device for measuring a magnet current flowing through the levitation magnet;
a passive magnetic field sensor for measuring the magnetic flux caused by the magnet current, with a magnetic flux measured value being formed; and
a measured value formation device configured to form the gap measured value using the magnetic flux measured value of said magnetic field sensor and the magnet current value.

13. The arrangement according to claim 11, wherein said evaluation device includes:
a first passive magnetic field sensor for measuring a first magnetic flux caused by the levitation magnet and for forming a first magnetic flux measured value;
a second passive magnetic field sensor for measuring a second magnetic flux caused by the levitation magnet and differing from the first magnetic flux, and for forming a second magnetic flux measured value; and
a measured value formation device connected to said first and second magnetic field sensors and configured to form the gap measured value using the first and the second magnetic flux measured value.

14. The arrangement according to claim 11, wherein said evaluation device includes:
a signal source for producing an electrical modulation voltage for modulating the magnet voltage applied to the levitation magnet;
a measurement device connected to the levitation magnet for measuring the magnet current caused by the modulated magnet voltage;
a first passive magnetic field sensor for measuring a magnetic flux caused by a magnet current, with a first magnetic flux measured value being formed;
a second passive magnetic field sensor for measuring a second magnetic flux caused by the levitation magnet and differing from the first magnetic flux, and for forming a second magnetic flux measured value; and
a measured value formation device connected to said measurement device and configured to:
determine an inductance value, which indicates an inductance of a magnetic system comprising the levitation magnet, the reaction rail, and the gap, taking into account a rate of change of the magnet current due to the modulation of the magnet voltage, and to form a first gap value using the inductance value and the magnet current value;
form a second gap value using the first magnetic flux measured value of the first magnetic field sensor and the magnet current value;
form a third gap value using the first and the second magnetic flux measured values; and
produce the gap measured value using the first, second, and third gap values.

* * * * *